United States Patent
Paolini

(10) Patent No.: US 8,508,361 B2
(45) Date of Patent: Aug. 13, 2013

(54) PERSONAL LOCATOR DEVICE FOR A CHILD HAVING AN INTEGRATED MOBILE COMMUNICATION DEVICE THAT QUALIFIES TO BE CARRIED IN AN EDUCATIONAL SETTING

(75) Inventor: Paul S. Paolini, Lunenburg, MA (US)

(73) Assignee: Paul S. Paolini, Lunenburg, MA (US)

( * ) Notice: Subject to any disclaimer, the term of this patent is extended or adjusted under 35 U.S.C. 154(b) by 324 days.

(21) Appl. No.: 12/986,516

(22) Filed: Jan. 7, 2011

(65) Prior Publication Data

US 2011/0175725 A1 Jul. 21, 2011

Related U.S. Application Data

(60) Provisional application No. 61/295,256, filed on Jan. 15, 2010.

(51) Int. Cl.
G08B 21/00 (2006.01)

(52) U.S. Cl.
USPC .............. 340/539.15; 340/539.13; 340/573.4; 455/457; 342/357.43

(58) Field of Classification Search
USPC ................ 340/539.13, 573.4; 375/373–377; 455/456, 457; 342/357.43
See application file for complete search history.

(56) References Cited

U.S. PATENT DOCUMENTS

| | | | |
|---|---|---|---|
| 5,014,040 A * | 5/1991 | Weaver et al. ............. | 340/568.1 |
| 5,485,163 A | 1/1996 | Singer et al. | |
| 5,652,570 A * | 7/1997 | Lepkofker ................. | 340/573.4 |
| 5,731,785 A | 3/1998 | Lemelson et al. | |
| 5,905,461 A | 5/1999 | Neher | |
| 6,362,778 B2 | 3/2002 | Neher | |
| 6,871,144 B1 | 3/2005 | Lee | |
| 6,967,576 B2 * | 11/2005 | Hayes et al. ............... | 340/572.1 |
| 7,353,034 B2 | 4/2008 | Haney | |
| 7,460,019 B2 | 12/2008 | Henderson | |
| 2004/0046658 A1 | 3/2004 | Turner et al. | |
| 2004/0198382 A1 | 10/2004 | Wong | |
| 2006/0232429 A1 | 10/2006 | Gonzalez | |
| 2007/0171045 A1 | 7/2007 | Henderson | |
| 2007/0182548 A1 | 8/2007 | Raad | |
| 2009/0042534 A1 * | 2/2009 | Levanen ................... | 455/404.2 |
| 2009/0231960 A1 | 9/2009 | Hutcheson | |

* cited by examiner

*Primary Examiner* — Mohammad Ghayour
*Assistant Examiner* — Mark Rushing
(74) *Attorney, Agent, or Firm* — James Cai; Schein & Cai LLP

(57) ABSTRACT

A personal locator device includes a housing that has a processor being coupled to a bus and a memory being coupled to the bus in the housing. The personal locator device also has a global positioning system comprising a receiver and a transmitter being coupled to the bus. The memory comprises an identification code. The personal locator device also has a mobile communication unit being coupled to the bus and a user interface comprising at least two inputs disposed on the housing. The personal locator device also has a power source. The transmitter is adapted to be controlled by the processor to provide a distress signal to a remote entity identifying the personal locator device by the identification code that a user associated with the personal locator device is in distress and the mobile communication unit is adapted to be programmable to at least two destinations to initiate communication to at least two individuals with each individual associated with one of the at least two inputs being preset in the memory. The personal locator device is adapted to not include a keypad for entering destination information individuals other than the at least two inputs being preset in the memory so the personal locator device qualifies to be carried in an setting that prohibits mobile telephones.

13 Claims, 3 Drawing Sheets

PERSONAL LOCATOR DEVICE FOR A CHILD HAVING AN INTEGRATED MOBILE COMMUNICATION DEVICE THAT QUALIFIES TO BE CARRIED IN AN EDUCATIONAL SETTING

CROSS REFERENCE TO RELATED PATENT APPLICATIONS

This patent applications claims priority to U.S. Provisional Patent Application No. 61/295,256 to Paul S. Paolini entitled "A PERSONAL LOCATOR DEVICE FOR A CHILD HAVING AN INTEGRATED MOBILE COMMUNICATION DEVICE THAT QUALIFIES TO BE CARRIED IN AN EDUCATIONAL SETTING" filed on Jan. 15, 2010, which is herein incorporated by reference in its entirety.

FIELD OF THE INVENTION

The present disclosure is directed to a personal locator device that can provide an emergency beacon signal reporting a position of the wearer and that includes an integrated mobile communication device that only includes inputs that can communicate with family members and that does not have a keypad to communicate with other individuals.

BACKGROUND OF THE RELATED ART

Child abductions occur in the United States on a level that is too frequent. Many parents will purchase their child a mobile telephone to communicate with the parents to coordinate picking up the child and for communicating with the child's nanny or guardian while at school. However, during school hours students generally will use the phone or mobile communication device to communicate with their friends in class using voice calls, e-mails, or text messages. Generally, this second use of the mobile phone may upset the progression of the class and disrupt the teachers. Students will periodically access the text messages and not pay attention in class during lectures. Also, this may result in the parent's receiving a large phone and service bill from the service provider as the students are not being monitored by the parents in school.

Therefore, many educational settings have banned the use or possession of cell phones, personal digital assistants, I-PHONE® mobile phones, media players, I-PODS®, and BLACKBERRY® communication devices and other electronic devices. For example in New York City, Mayor Michael Bloomberg and Schools Chancellor Joel Klein have refused to drop the ban on cellular telephones notwithstanding the protests of parents. New York City, Mayor Michael Bloomberg and Schools Chancellor Joel Klein insist cell phones are a distraction and are used to cheat, take inappropriate photos in bathrooms and organize rendezvous. Cellular phones are also a frequently stolen item. However, this policy is upsetting to parents. Without a mobile communication or a tracking device, there may be a greater risk that a child can be potentially abducted or kidnapped without the mobile communication device to call for help. Therefore, there is a need in the art for a mobile communication device that can act as a personal locator device and that also can be permitted to be used in an educational setting without causing disruption and that does not permit the student to call third parties, take photos, send e-mails or text with friends.

SUMMARY OF THE INVENTION

According to a first aspect of the present disclosure, there is provided a personal locator device. The personal locator device includes a housing that has a processor being coupled to a bus and a memory being coupled to the bus disposed in the housing. The personal locator device also has a global positioning system comprising a receiver and a transmitter coupled to the bus. The memory comprises an identification code. The personal locator device also has a mobile communication unit being coupled to the bus and a user interface comprising at least two inputs disposed on the housing. The personal locator device also has a power source.

The transmitter is adapted to be controlled by the processor to provide a distress signal to a remote entity. The distress signal identifies the personal locator device by the identification code that a user associated with the personal locator device is in distress. The device also has a mobile communication unit. The unit is adapted to be programmable to at least two destinations to initiate communication to at least two individuals with each individual associated with one of the at least two inputs being preset in the memory. The personal locator device is adapted to not include a keypad for entering destination information to individuals other than the at least two inputs being preset in the memory so the personal locator device qualifies to be carried in an setting that prohibits mobile telephones.

In yet another aspect of the present disclosure there is provided a method of locating an individual in distress comprising selectively transmitting a distress signal to a remote entity identifying a personal locator device by an identification code that a user associated with the personal locator device is in distress. The method also provides the personal locator device with a mobile communication unit. The unit is operable to make voice calls. The personal locator device is adapted to be programmable to initiate communication to only at least two individuals with each individual associated with an input being preset in a memory. The method provides that the personal locator device qualifies that the personal locator device may be permitted in an setting that prohibits mobile telephones by the personal locator device being adapted to not include a keypad for entering destination information to individuals other than the at least two inputs being preset in the memory.

In another embodiment of the present disclosure, there is provided a personal locator device that has a housing including a processor being coupled to a bus, and a memory being coupled to the bus disposed in the housing. The housing comprises a wrist watch like housing and a band connected to the wrist watch housing. A global positioning system comprises a receiver and a transmitter being coupled to the bus. The memory has an identification code and a mobile communication unit being coupled to the bus comprising a speaker and a microphone. A user interface includes at least two inputs disposed on the housing. The personal locator device also has a power source. The transmitter is adapted to be controlled by the processor to provide a distress signal to a remote entity identifying the personal locator device by the identification code that a user associated with the personal locator device is in distress.

The mobile communication unit is adapted to be programmable to at least two destinations to initiate communication to at least two individuals with each individual associated with one of the at least two inputs being preset in the memory. The at least two individuals are at least a guardian of a child wearing the watch or parent. The personal locator device is adapted to not include a keypad for entering destination information to individuals other than the at least two inputs being preset in the memory so the personal locator device qualifies to be carried in an setting that prohibits mobile telephones.

In yet another aspect of the present disclosure there is provided a personal locator device that has a computer device connected to a network and a navigation system for determining a real time location of the personal locator device. The computer device is adapted to transmit a distress signal to a remote entity via the network identifying the personal locator device and that a user associated with the personal locator device is in distress. The personal locator device also has an integrated mobile communication unit. The unit is adapted to be programmable to at least two destinations to initiate communication to at least two individuals via the network. Each individual is associated with one input of at least two inputs stored in a memory. The at least two individuals are at least a guardian of a child wearing the watch or parent. The inputs are disposed on an exterior of the personal locator device. The personal locator device also has a parental control device wherein the personal locator device is adapted to not accept destination information of individuals other than the individuals associated with the at least two inputs so the personal locator device qualifies to be carried in an setting that prohibits mobile telephones.

BRIEF DESCRIPTION OF THE FIGURES

The foregoing and other objects, features and advantages of the invention will be apparent from the following more particular description of preferred embodiments of the invention, as illustrated in the accompanying drawings in which like reference characters refer to the same parts throughout different views. The drawings are not meant to limit the invention to particular mechanisms for carrying out the invention in practice, but rather, are illustrative of certain ways of performing the invention. Others will be readily apparent to those skilled in the art.

DETAILED DESCRIPTION OF THE PREFERRED EMBODIMENTS

The present disclosure is directed to a personal locator device 10 that has an integrated mobile communication device incorporated into the device 10. The personal locator device 10 also further includes an input configuration that only permits calls to exclusive individuals and will not permit input to calls or communication to other individuals. The personal locator device 10 and mobile communication device will be allowed to be used in an educational setting, such as a school that currently does not permit mobile communication devices, such as cell phones, BLACKBERRY® communication devices, I-PHONE® mobile communicators or the like. The instant personal locator device 10 and integrated mobile communication device is superior to a cellular phone as the students pose no distraction to the teachers by sending text messages to other students or making voice calls to individuals other than the exclusive individuals. Preferably, the exclusive individuals are only the child's parents, guardian, educators, school principals, nanny, protector or emergency personnel. Preferably, the personal locator device 10 has parental control functionality and does not include any keypad with numerical or alphanumeric keys.

Figure 1:
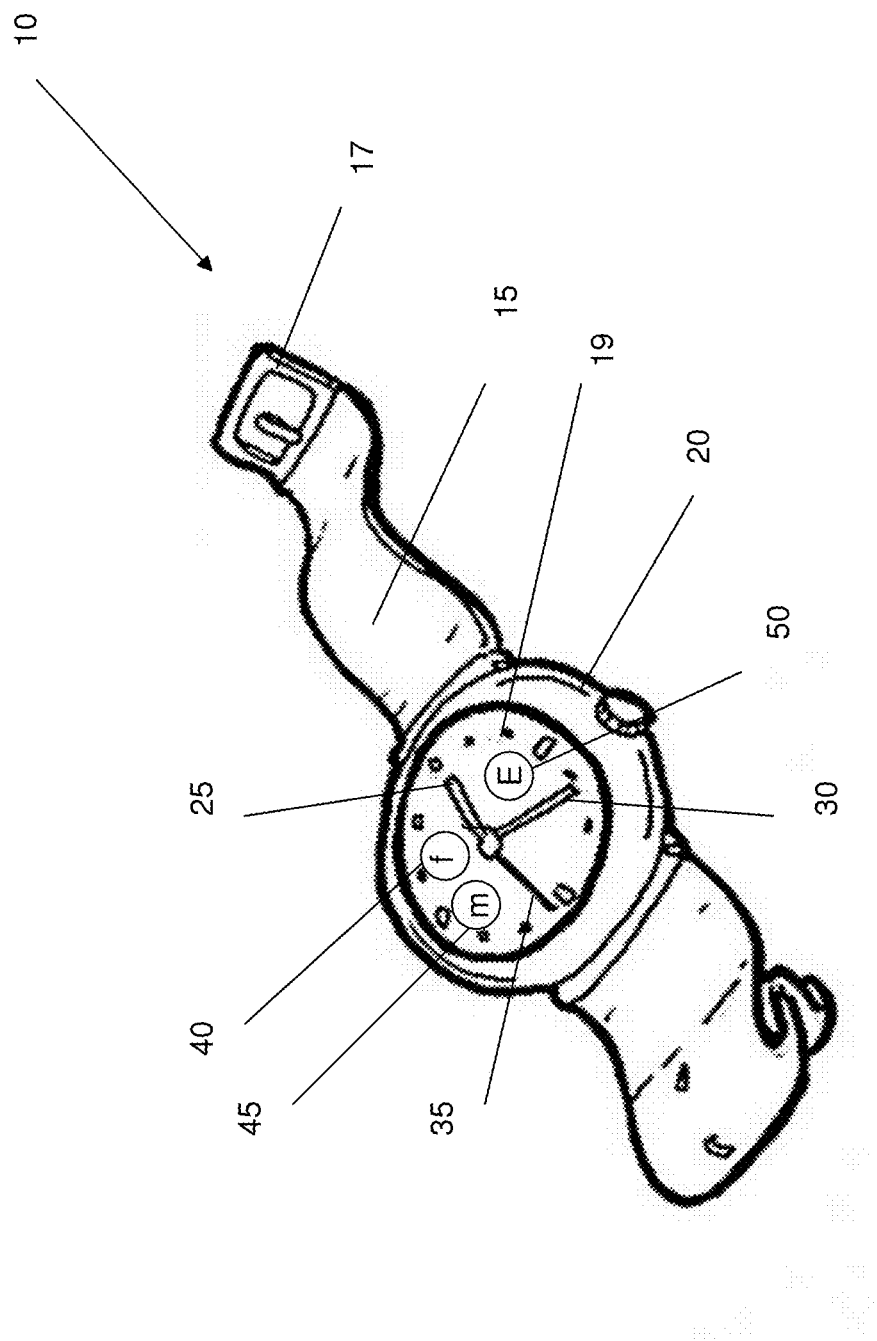
FIG. 1 shows a personal locator device according to the present disclosure having a mother call input button, a father call input button and an emergency distress signal input button.

Turning to FIG. 1, there is shown a personal locator device 10. The personal locator device 10 preferably takes the form of a conventional watch having a band 15, a face 20 and a clasp 17 to fasten the band 15 securely around the wrist of the child. In yet another exemplary embodiment of the present disclosure, the personal locator device 10 may take another form, such as, for example, a "clip on device" affixed to a backpack, a book bag or clip that may be secured on the child's person, for example a leg bracelet. The face 20 of the personal locator device 10 may include a clock dial 19, and a number of watch hands, for example an hour hand 25, a minute hand 30 and a seconds hand 35. It should be appreciated that the watch face 20 may further include an analog watch device (not shown) to keep accurate time, however it should also be appreciated that the watch face 20 may further be manufactured as a digital device instead of the analog configuration shown with a liquid crystal display. Various configurations are possible and within the scope of the present disclosure.

The personal locator device 10 also includes a number of inputs, or a first input 40, a second input 45 and a third input 50 and does not include a keypad including a number of QWERTY keys or any touch screen, or any touch tone numerals for making voice calls or electronic messages. The inputs 40, 45, 50 preferably are a parental control type device that will restrict the use of the personal locator device 10 and the mobile communication device so the device 10 can qualify for uninterrupted use in an educational setting. The first input 40 of the device 10 preferably can be preset to initiate a voice call to a child's first parent, or, for example, a child's father as is designated "F". The second input 45 of the device 10 preferably can be preset to initiate a voice call to a child's second parent, or, for example, a child's mother and is designated "M".

It should be appreciated that these destinations form no limitations to the present disclosure and the present personal locator device 10 with integrated mobile communication device may alternatively be preset to call other individuals, such as, for example, a guardian, a nanny, a protector, adopted parents, godfather, godmother, a grandparent, an aunt, an uncle, a brother, a sister, a neighbor, a cousin, a trusted friend, lawyer, or any other individual associated with the care of the child or that may get in touch with an individual associated with the care of the child. The third input 50 of the device 10 preferably can be preset to initiate an emergency beacon signal to an emergency personnel, such as, for example, a child recovery service, the police, the fire department, the military, paramedics, the FBI, a marine vessel, or a search and rescue unit. Various emergency destination addresses are possible depending on the geographic location of any potential abduction and may vary and are within the scope of the present disclosure. Preferably, in one embodiment, the parents can pay a subscription fee to use the personal locator device 10 and a certain amount per month for child monitoring.

Figure 2:
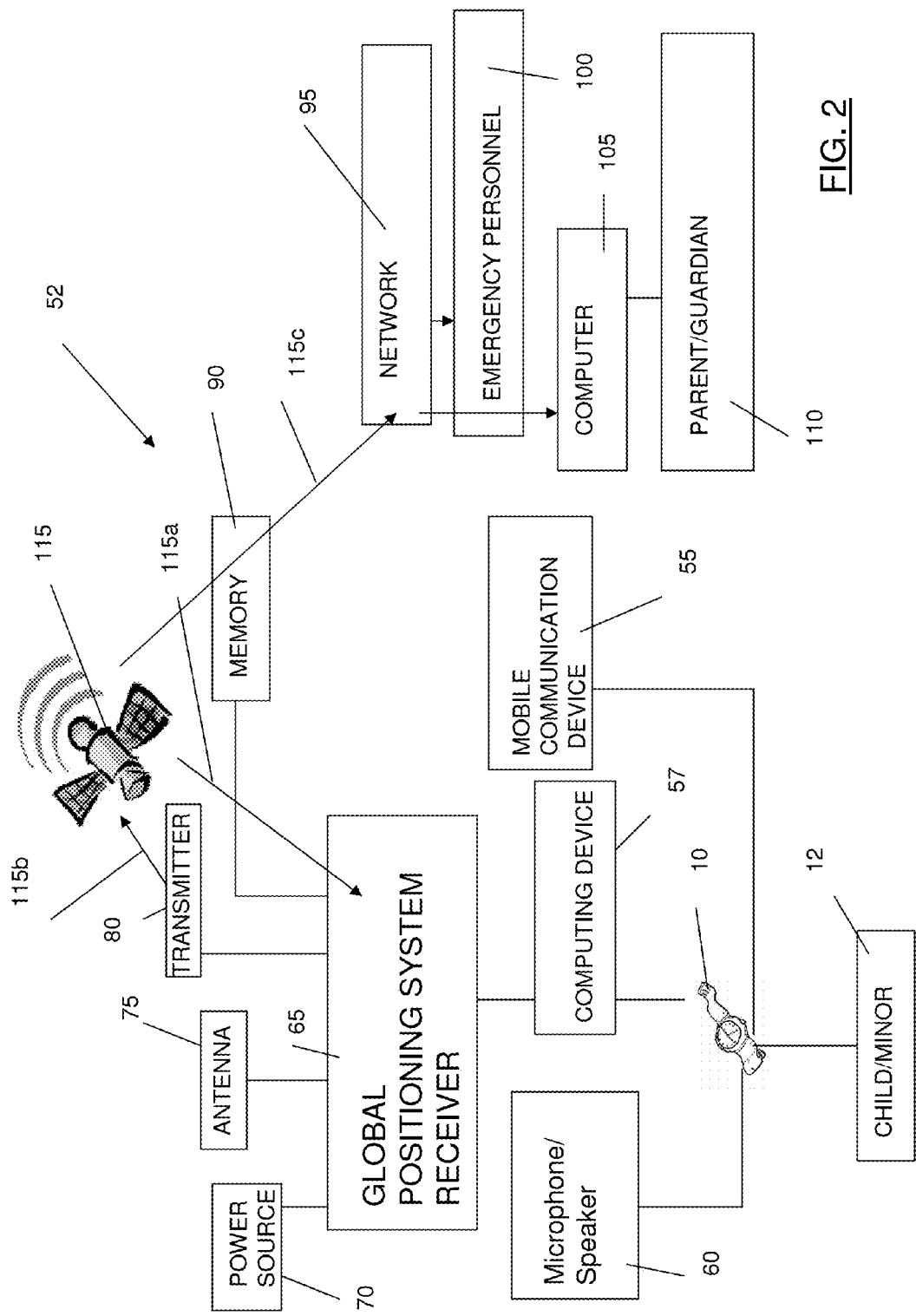
FIG. 2 shows a system level diagram of the personal locator device that includes a navigation device that communicates via satellite to a network to communicate a distress signal from the personal locator device to the emergency personnel or parent operating with a computer.

Turning now to FIG. 2, there is shown a system level diagram generally shown as reference numeral 52. The system 52 preferably includes a navigation system, which generally is represented as a Global Positioning System having a GPS receiver 65 that is incorporated into the personal locator device 10 and that receives downlink timing signals 115a from a Global Positioning System satellite 115. "GPS" is a shorthand name for Global Positioning System, a system of satellites 115, computers, and receivers that is able to determine the latitude and longitude of a receiver 65 on land and sea by calculating the time difference for signals 115a from different satellites 115 to reach the receiver 65. The global positioning system is well known in the art.

Developed and operated by the U.S. Defense Department, the Global Positioning System (GPS) is a radio-navigation system consisting of a 24-satellite constellation. Using precise location and timing signals emitted by these satellites, GPS permits land, sea and airborne users to determine their three-dimensional position, velocity and time twenty four hours a day, in all weather. The instant GPS system is operable to obtain positional information anywhere in the world, providing location with a precision and accuracy far better than any other radio navigation system. Preferably, using the signals 115a received by the GPS receiver 65, the precise and accurate location in longitude and latitude of the personal locator device 10 may be determined. The GPS receiver 65 preferably includes an antenna 75, a wireless signal transmitter 80, an identification memory 90, and signal processing chipset (not shown) that are all coupled to a power source 70. The chipset (not shown) preferably includes a unique code that identifies the specific receiver 65.

Alternatively, the system 52 preferably may be manufactured using other navigation devices 65, such as, for example, EGNOS, Galileo, or Euridis satellite navigation. For example, the system 52 may alternatively infer the position of the personal locator device 10 using a mobile telephone network. System 52 may obtain an intensity reading and a direction of a radiofrequency signal emitted from a mobile communication device 55 to a mobile communication tower (not shown) as is known in the art. Using the intensity and direction of the signal with the known location of the mobile communication tower in a software program, the system 52 can infer the location of the personal locator device 10 and the child 12. Still in another alternative embodiment, the system 52 may include an electronic compass to determine a location of the personal locator device 10 and the child 12. Further and less preferably, the personal locator device 10 may alternatively detect positional information as the child passes around certain preset land beacons.

Preferably, the system 52 includes an integrated mobile communication device 55 and a computing device 57 disposed in the housing of the watch face 20. The personal locator device 10 also includes a speaker and a microphone generally shown as reference numeral 60. The mobile communication device 55 may include any GSM, CDMA, TDMA, FDMA mobile phone that can be operable with a SIM card and operable using known mobile communication providers. The mobile communication device 55 is operable with antenna 75 under any of the frequency ranges of 850 MHz, 900 MHz, 1800 MHz, and 1900 MHz depending on the specific country the locator device 10 is used. In addition to the power source 70, which is preferably a lithium ion battery, the mobile communication device 55 of the personal locator device 10 may require a small microchip, called a Subscriber Identity Module or SIM Card, to function. The SIM Card is usually placed underneath the battery 70 in the rear of the personal locator device 10, and (when properly activated) stores the mobile communication device's 55 configuration data, and information about the mobile communication device 55 itself, such as which calling plan the subscriber is using (i.e., Verizon®, AT&T®, T-Mobile®, Sprint®, Orange®, NTT DOCOMO®, etc). When the subscriber removes the SIM Card, it can be re-inserted into another phone that is configured to accept the SIM card. Preferably, the mobile communication device 55 requires a printed circuit board (not shown) for engaging with other components of the device and may be operable to engage with electronics for VOICE OVER IP (VOIP), Wi-Fi, infrared, and Worldwide Interoperability Microwave Access (WiMAX) for sending voice and data. Preferably, the mobile communication device 55 further includes a radiofrequency module, a transmitter and receiver or transceiver, an RF surface wave acoustic filter, and an amplifier. The mobile communication device 55 may have various configurations that are within the scope of the present disclosure.

Figure 3:
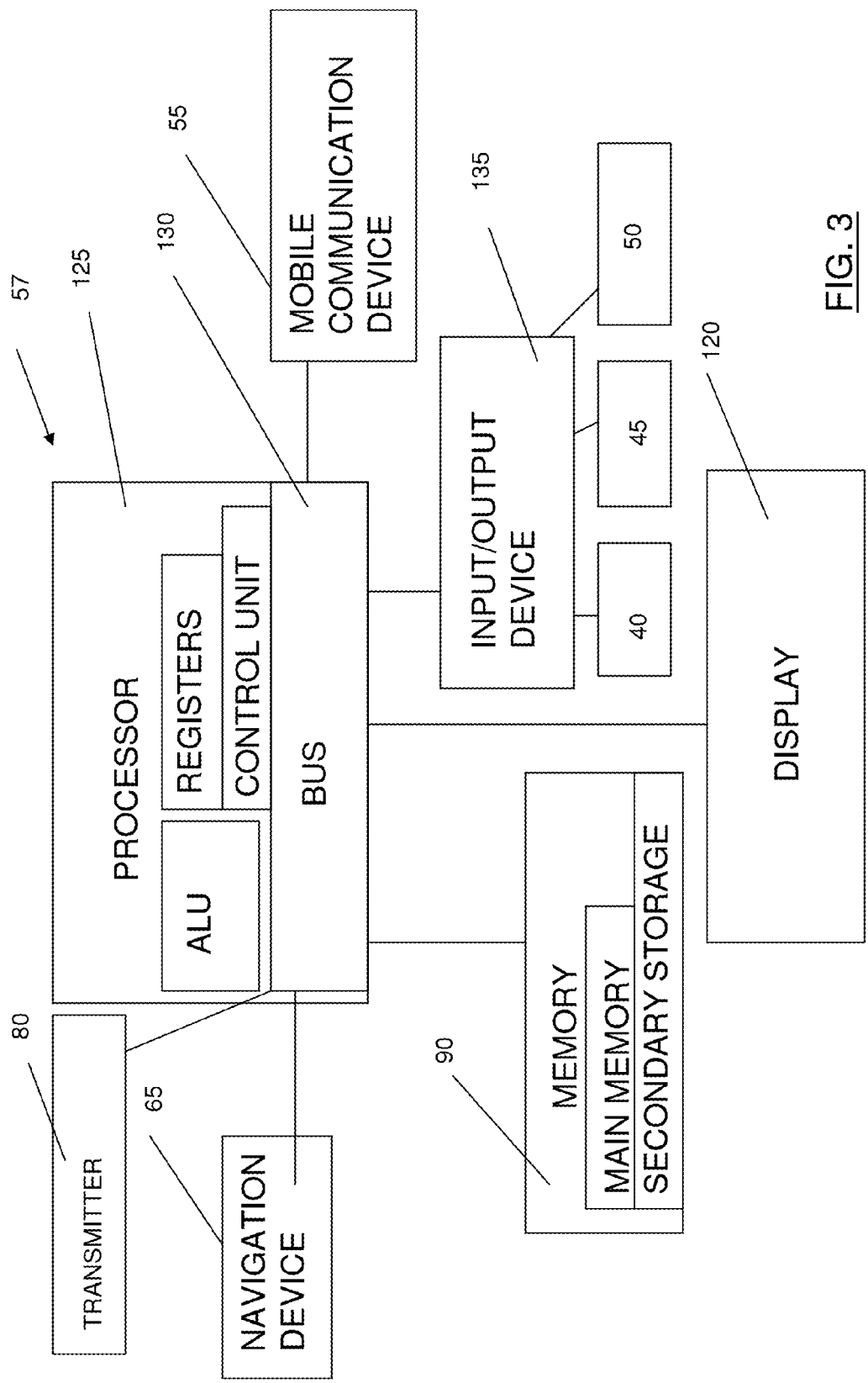
FIG. 3 shows a general purpose computer operatively connected to a navigation device and a mobile communication device.

Preferably, the computer device 57 continuously receives downlink signals 115a from the satellite 115 via the GPS receiver 65 and using this information calculates a three dimensional position of the personal locator device 10 and stores the position in memory 90 (FIG. 3). When in distress, the child 12 may activate at least one of the inputs 40, 45, 50 on the dial 19 of the watch face 20. In response, the computing device 57 will communicate a distress signal 115b via the transmitter 80 to the satellite 115 or other destination. It should be appreciated that in another embodiment, the distress signal 115b may be routed via an electronic message that is communicated via the Internet or via a mobile telephone communication network and does not necessarily have to be communicated to the satellite 115. The distress signal 115b preferably includes a three dimensional or two dimensional position information including a latitude and longitude of the personal locator device 10. The distress signal 115c is received by the satellite 115 and then is routed to a network 95. Distress signal 115c can be in the form of an internationally recognized means for obtaining help and may take the form of radio signals from a distance.

A distress signal 115c preferably indicates that a child 12 is threatened by grave and imminent danger and requests immediate assistance. Preferably, the distress signal 115c communicates at least two functions or an alert or notification of a distress in progress and the exact position or location (or localization or pinpointing) of the child 12 in distress. In yet another embodiment, the personal locator device 10 may use the COSPAS-SARSAT 406 MHz radio frequency distress signal 115c directly to the emergency personnel 100. COSPAS-SARSAT 406 MHz signal is generally used by hikers, backpackers, trekkers, mountaineers and other ground-based remote adventure seekers and personnel working in isolated backcountry areas using a small, portable personal locator beacon. In yet another alternative embodiment, the distress signal 115c or 115b can be a signal associated with a civilian or military aircraft emergency frequency for voice distress using 121.5 MHz or 243 MHz.

Network 95 may be any communication network in the art, and may include a network of telecommunications links and nodes arranged so that a message or the signal 115c may be passed from one part of the network to another over multiple links and through various nodes.

Telecommunications network links (including their endpoints or "nodes") may in turn be built out of hierarchical transmission systems. Examples of telecommunications networks 95 may be any wireless or wired network, a computer network, the Internet, a public switched telephone network, or an aeronautical ACARS network. Network 95 via the links may communicate the distress signal 115c to emergency personnel 100 with the longitude and latitude positional information of the child's 12 location so the emergency personnel 100 can be dispatched and recover the child 12 along with medical care and medical personnel, if needed. Emergency personnel 100 may be the parents or a guardian, the police, fire department, paramedics, the military, a private investigator, a recovery individual or team or any other individual known in the art.

Alternatively, network 95 via the links may communicate the distress signal 115c to a computer device 105 or a mobile communication device 105, such as, a PDA. Network 95 can communicate the position of the child 12. Network 95 preferably receives data associated with the longitude and latitude information of the child's 12 location. In this manner, a parent 110 or guardian 110 can track the child 12 using a software application stored on the memory associated with a computer 105. The software application stored on the computer device 105 may, for example, overlap the child's position over a geographic map displayed on a display. Parent or guardian 110 may then track the child 12 in real time or in an emergency situation or the parent or guardian 110 may contact the emergency personnel 100 to recover the child 12. It is envisioned that in one embodiment, the parent or guardian 110 may track the child 12 in a non-emergency situation using PDA or computer device 105.

Turning now to FIG. 3, there is shown a general purpose computer to be used with certain aspects of the personal locator device 10 and method of the present disclosure. The present disclosure may be implemented on a computer system 57. The computer system 57 preferably includes the generic components of most general purpose computers.

The computer system 57 comprises an interconnection mechanism, such as a bus 130, or circuitry which couples to an input device 135, such as a keyboard. Keyboard 135 is optional and is used only to initially program the computer system 57 with the parent or guardian's phone numbers, or email addresses. Keyboard 135 can be operatively connected to the personal locator device 10 and then removed so the child 12 cannot manipulate and make voice calls to other individuals other than those which are preset on the inputs 40, 45 and so the device 10 is used as intended to activate the emergency distress signal 50. It is envisioned that the personal locator device 10 may have a specialized unique computer port (not shown). Port is specialized so an input device 135 may be coupled to the personal locator device 10 for installation and initial programming of the personal locator device 10 and so other USB type keyboard cannot be connected to the personal locator device 10. The system also has a processor 125 (such as a microprocessor having an arithmetic logic unit, a register and a control unit). The computer 57 also includes a storage device or memory 90 (such as a computer disk for a main memory and secondary storage) and an optional output device such as a monitor or screen 135. Alternatively, the personal locator device 10 may have no screen 135 to disguise the personal locator device 10 so that in a kidnapping or abduction situation, the personal locator device 10 will not be removed by the abductor or kidnapper. Moreover, distress signal may be silent so the kidnapped or abductor will be unaware of the call for help.

The computer 57 also has a mobile communication device 55 that may also act as a network connection for connecting to the Internet. Various embodiments of the invention will be described in conjunction with the components of computer systems. A typical example of a computer system is an IBM® Personal Computer, an APPLE® MAC® computer, MICROSOFT WINDOWS MOBILE® computer, or a compatible computer. Preferably, when the user depresses a button or touch screen prompt or otherwise activates an input 50, the processor 125 access a current three dimensional location of the personal locator device 10 as received from the navigation system 65. Processor 125 then sends a control signal to the transmitter 80 to deliver the emergency beacon and to transmit the precise three dimensional location of the personal locator device 10 in a signal 115b (FIG. 2).

Signal 115b is preferably a digital signal and may further comprise data with information to identify the personal locator device 10. Signal 115b is communicated in a high powered beam to the satellite 115 or via a communication network 95 (the Internet) to obtain the emergency personnel 100 and to indicate a kidnapping, abduction or that the user is lost. Additionally, when the user depresses a button or touch screen prompt or otherwise activates the input 40 or 45, the processor 125 access a stored address in memory 90. The address is at least one of a phone number, an e-mail address, a SKYPE® user name, a VOIP destination, or any other communication address of at least one the child's mother or the child's father or other guardian as previously discussed of the personal locator device 10. Processor 125 then controls the mobile communication device 55 to call, send a text message, or e-mail, the child's parent. Using the microphone and speaker generally shown as reference numeral 60, the child can communicate with the parents, and specifically not communicate or send or receive text messages and e-mails with friends or take photos.

In yet an alternative embodiment of the present disclosure, the personal locator device 10 may be further manufactured with a keypad that is a QWERTY keypad, or a touchtone keypad that is rendered inoperable using a parental control device by a parent so the child can only communicate with the child's mother or the child's father or depress the emergency button. In yet an alternative embodiment of the present disclosure, the personal locator device 10 may be manufactured without the navigation device 65 and may only have the mobile communication device 55.

In yet an alternative embodiment of the present disclosure, the personal locator device 10 may be further manufactured with a diagnostic device to measure a parameter of the wearer, such as an amount of glucose in the blood of the wearer or other parameter (i.e., diabetes information, heart rate, pulse, etc). In a further embodiment, the device 10 is a quad band phone that can make outgoing calls only with a navigation device and may optionally have a medical diagnostic device.

Generally, in operation, the computer system operable is controlled by an operating system. Typical examples of operating systems are LINUX®, MS-DOS, Windows 95®, XP®, Windows 7®, MICROSOFT WINDOWS MOBILE® from Microsoft Corporation, or Solaris and SunOS from Sun Microsystems, Inc., or the Apple OSX from Apple Corporation. As the computer system operates, input such as input search data, database record data, programs and commands, received from users or other processing systems, are stored on storage device. Certain commands cause the processor to retrieve and execute the stored programs. The programs executing on the processor may obtain more data from the same or a different input device, such as a network connection. The programs may also access data in a database for example, and commands and other input data may cause the processor to index, search and perform other operations on the database in relation to other input data. Data may be generated which is sent to the output device for display to the user or for transmission to another computer system or device. Typical examples of the computer system are personal computers and workstations, hand-held computers, dedicated computers designed for a specific purpose, and large main frame computers suited for use many users. The present invention is not limited to being implemented on any specific type of computer system or data processing device.

It is noted that the present invention may also be implemented in hardware or circuitry which embodies the logic and processing disclosed herein, or alternatively, the present invention may be implemented in software in the form of a computer program stored on a computer readable medium such as a storage device. In the later case, the present invention in the form of computer program logic and executable instructions is read and executed by the processor and instructs the computer system to perform the functionality disclosed as the invention herein. If the present invention is embodied as a computer program, the computer program logic is not limited to being implemented in any specific programming language. For example, commonly used programming languages such as C, C++, JAVA as well as others may be used to implement the logic and functionality of the present invention. Furthermore, the subject matter of the present invention is not limited to currently existing computer processing devices or programming languages, but rather, is meant to be able to be implemented in many different types of environments in both hardware and software.

Furthermore, combinations of embodiments of the invention may be divided into specific functions and implemented on different individual computer processing devices and systems which may be interconnected to communicate and interact with each other. Dividing up the functionality of the invention between several different computers is meant to be covered within the scope of the invention.

While this invention has been particularly shown and described with references to a preferred embodiment thereof, it will be understood by those skilled in the art that is made therein without departing from the spirit and scope of the invention as defined by the following claims.

What is claimed is:

1. A personal locator device comprising:
a housing including a processor being coupled to a bus, and a memory being coupled to the bus disposed in the housing;
a global positioning system comprising a receiver and a transmitter, the receiver and transmitter being coupled to the bus;
the memory comprising an identification code; a mobile communication unit being coupled to the bus;
a user interface comprising at least two inputs disposed on the housing, and wherein at least one input is configured to store a telephone number of a child's mother when said input is activated and at least the other input is configured to store the telephone number of a child's father when said at least other input is activated;
a power source;
the transmitter being adapted to be controlled by the processor to provide a distress signal to a remote entity, the distress signal identifying the personal locator device by the identification code that a user associated with the personal locator device is in distress; and
the mobile communication unit being adapted to be programmable to initiate communication to one of at least two individuals with each individual associated with one of the at least two inputs; and
the personal locator device being adapted to not include a keypad for entering destination information to individuals other than the at least two inputs being preset in the memory so the personal locator device qualifies to be carried in a setting that prohibits mobile telephones.

2. The personal locator device of claim 1, wherein the housing comprises a watch adapted to surround a wrist of a wearer.

3. The personal locator device of claim 1, wherein the transmitter is adapted to be controlled by the processor to provide the distress signal to a satellite.

4. The personal locator device of claim 3, wherein the satellite relays the distress signal to a second entity.

5. The personal locator device of claim 3, wherein the satellite relays the distress signal to a rescuer.

6. The personal locator device of claim 1, wherein the personal locator device qualifies to be carried in an educational setting that prohibits mobile telephones.

7. The personal locator device of claim 1, wherein the housing includes a band adapted to fit around a child's wrist.

8. The personal locator device of claim 1, wherein the identification number is stored on a SIM card being coupled to an adapter connected to the bus.

9. The personal locator device of claim 1, wherein the distress signal is communicated to at least two different entities.

10. The personal locator device of claim 1, wherein the distress signal is communicated in a silent inaudible manner.

11. The personal locator device of claim 1, wherein at least one input is used to store a telephone number of a child's parent.

12. A personal locator device comprising:
a housing including a processor coupled to a bus, and a memory coupled to the bus disposed in the housing, wherein the housing is connected to a band that surrounds a wrist of the wearer;
a global positioning system comprising a receiver and a transmitter, wherein the receiver and transmitter are coupled to the bus;
the memory comprising an identification code;
a mobile communication unit coupled to the bus;
a user interface comprising at least two inputs disposed on the housing, wherein at least one input is a first button used to store a telephone number or electronic address of a child's mother and at least the other input is a second button used to store the telephone number or electronic address of a child's father, and wherein the first and the second buttons are disposed on an exterior surface of the housing;
a power source;
the transmitter being adapted to be controlled by the processor to provide a distress signal to a remote entity, the distress signal identifying the personal locator device by the identification code that a user associated with the personal locator device is in distress; and
the mobile communication unit configured to be programmable to initiate communication to one of at least two individuals with each individual associated with one of the at least two inputs; and
the personal locator device adapted to not include a keypad for entering destination information to individuals other than the at least two inputs being preset in the memory so the personal locator device qualifies to be carried in a setting that prohibits mobile telephones.

13. The personal locator device of claim 12, wherein the housing resembles a wrist watch.

* * * * *